Sept. 8, 1970     H. LAUB III     3,527,084
LEAK-DETECTOR
Filed April 25, 1968     3 Sheets-Sheet 1
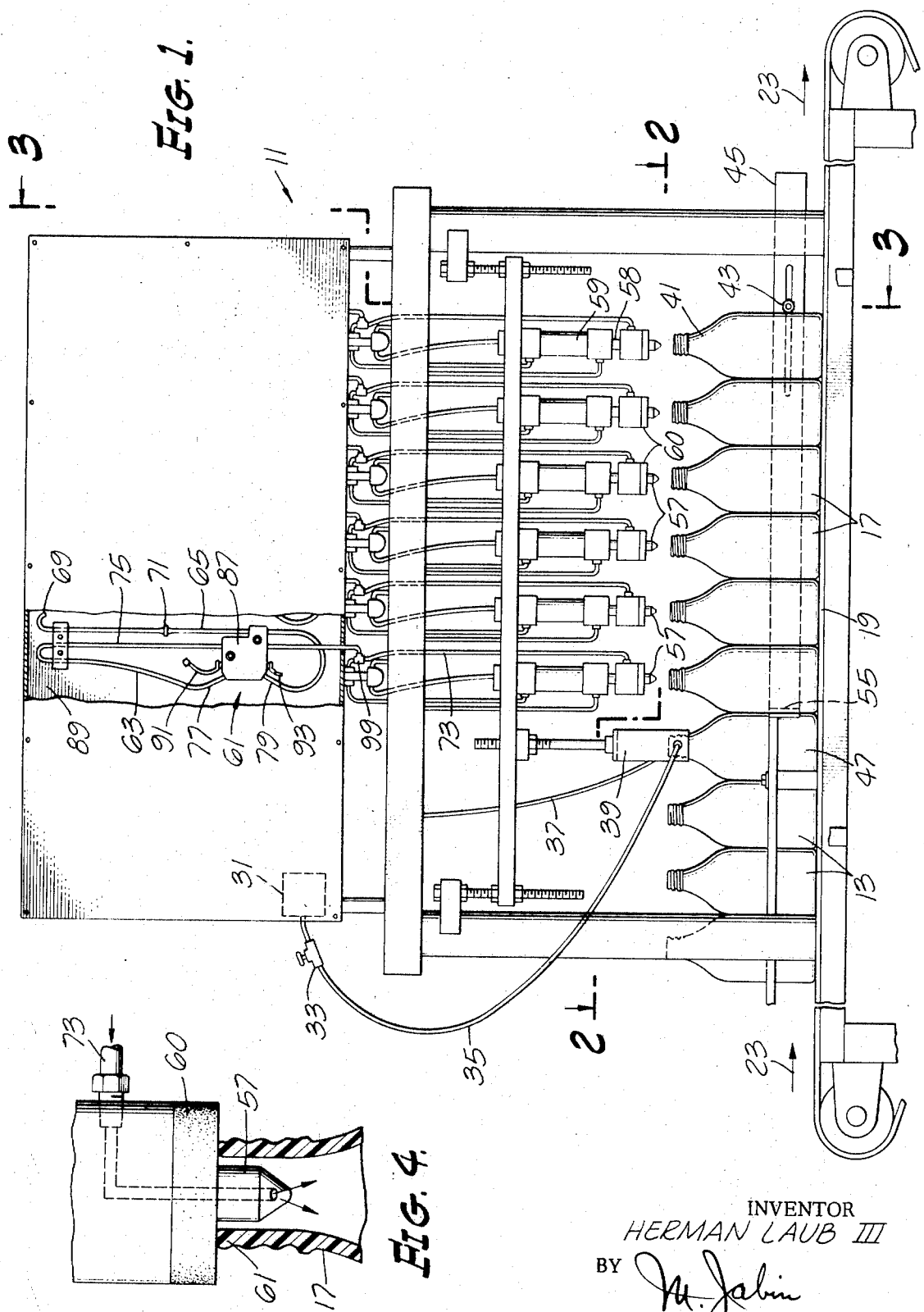
INVENTOR
HERMAN LAUB III
BY
ATTORNEY

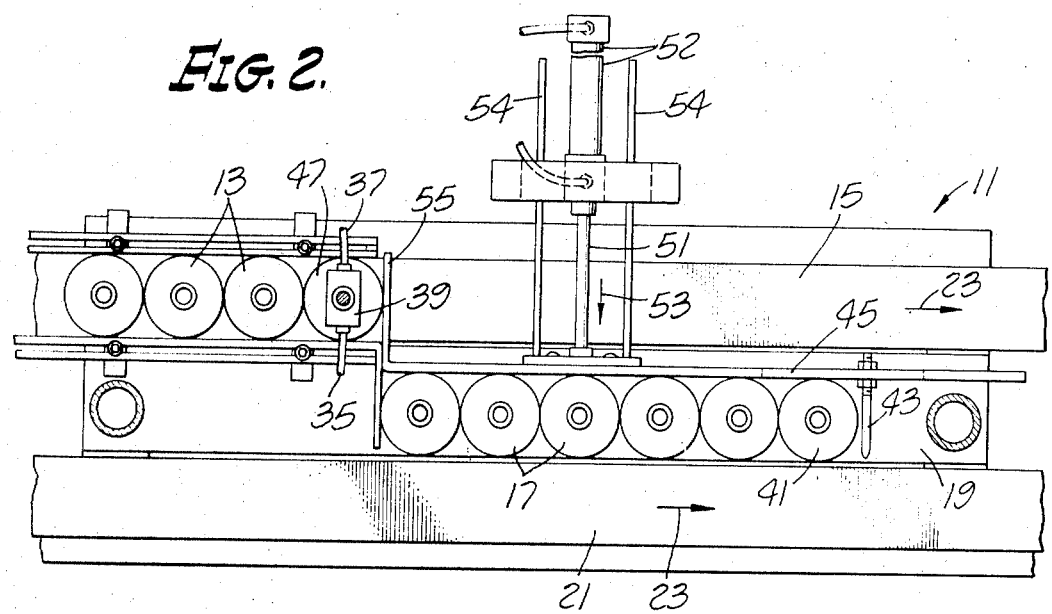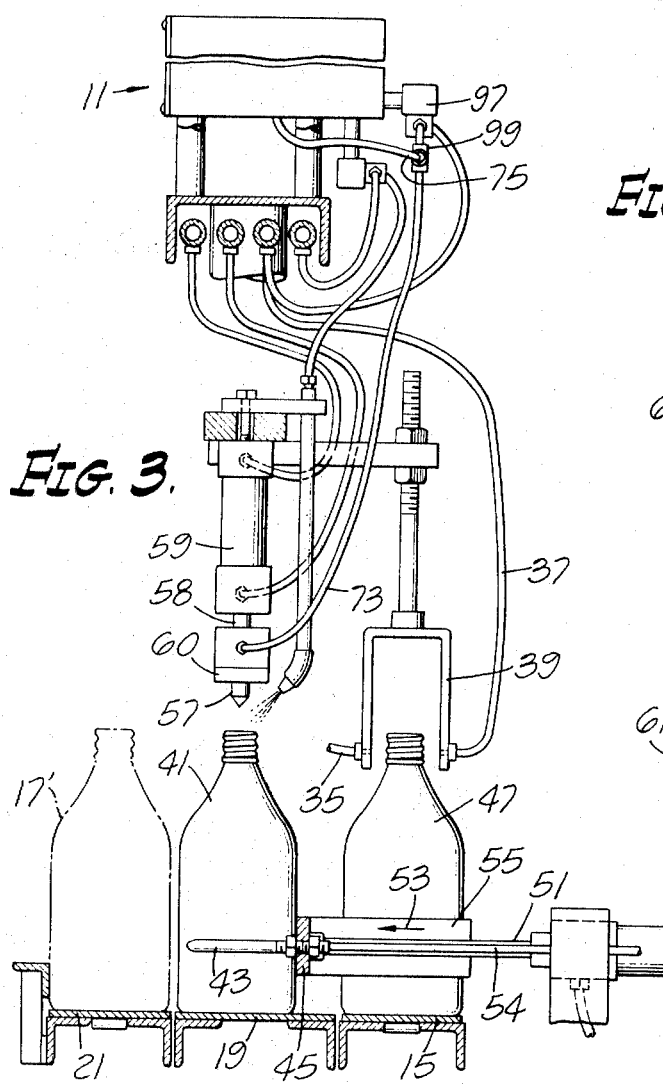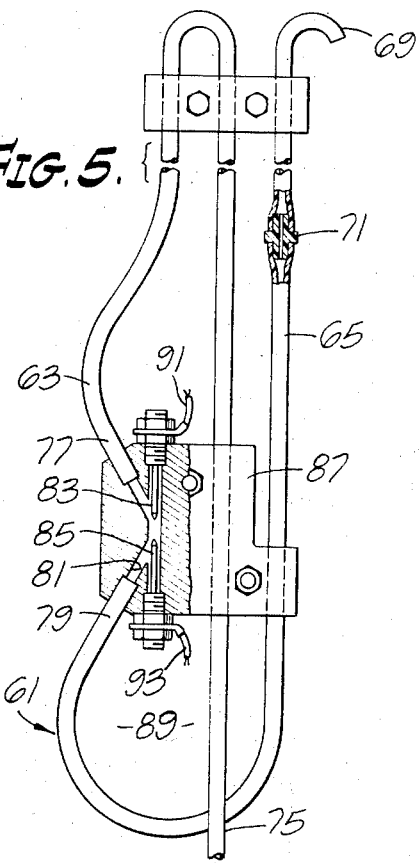

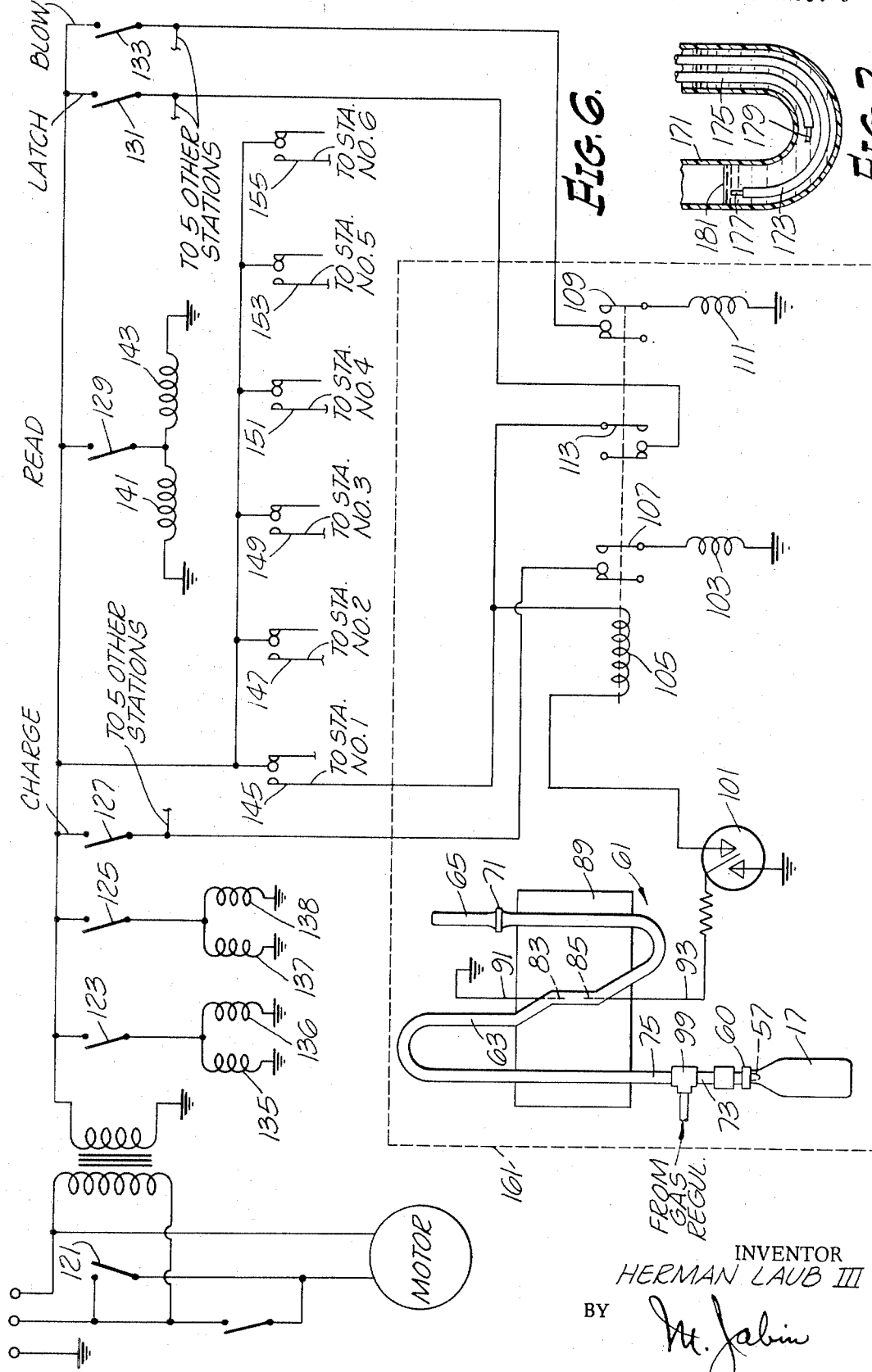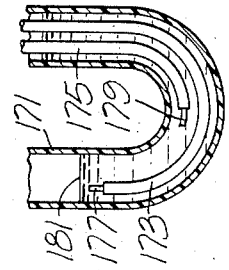

United States Patent Office 3,527,084
Patented Sept. 8, 1970

3,527,084
LEAK-DETECTOR
Herman Laub III, 244 N. San Marino Ave.,
San Gabriel, Calif. 91775
Filed Apr. 25, 1968, Ser. No. 724,035
Int. Cl. G01m 3/32
U.S. Cl. 73—45.2
8 Claims

ABSTRACT OF THE DISCLOSURE

A testing machine is disclosed for automatically detecting leaks in containers. An electro-manometer is used in combination with electronic amplification so as to utilize a change in volume, instead of a change in pressure, in order to be able to detect leaks in deformable plastic containers. The machine can test a plurality of containers simultaneously, and automatically shuts itself off when the containers are no longer fed to it.

BACKGROUND OF THE INVENTION

Containers of varying sizes, shapes and materials are in widespread use, and different types of machines for testing the containers for leaks are in use. Such machines generally fill the container under test with gas or liquid, and record a decrease in pressure within the container as an indication of a leak.

Plastic containers, which are becoming more and more popular, cannot be tested by such machines, however, because plastic is deformable, and it cannot be determined whether there is a decrease in pressure because of a leak or because of distortion of the walls of the container being tested. The problem becomes extremely acute in the case of plastic bottles used for caustic materials such as bleach, for even extremely small holes in the bottles will result in very damaging leaks.

SUMMARY OF THE INVENTION

According to the preferred embodiment of the present invention, a leak detector includes a manometer, a snubbing orifice, a control circuit and a relay circuit in combination, in order to detect leaks in plastic containers by measuring a change of volume.

The manometer functions as a switch and utilizes a unique electrically-conductive fluid, instead of conventional mercury, in order to overcome a number of defects found with mercury electro-manometers. Mercury dissolves most electrodes, forms insoluble mercury compounds which are partial conductors, and requires higher operating pressures. The orifice is located in the open leg of the manometer, and speeds up the test cycle by enabling the electrically-conductive fluid to go quickly to the desired position.

A time-delay diaphragm switch is combined with a stream of air through an air gap that is interrupted by the presence of one of the bottles to be tested, so that the machine automatically shuts itself off when there are no more bottles to block the air stream.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a front view of a plastic-container leak-detector according to the present invention.

FIG. 2 is a view taken along the line 2—2 of FIG. 1.
FIG. 3 is a view taken along the line 3—3 of FIG. 1.
FIG. 4 is an enlarged view of a spout of a typical test head shown in FIG. 1.
FIG. 5 is an enlarged sectional view of a typical manometer shown in FIG. 1.
FIG. 6 is a schematic diagram of the circuit coupled to the manometer of FIGS. 1 and 4.
FIG. 7 is a front view showing a different embodiment of the manometer of the present invention.

DESCRIPTION OF THE PREFERRED EMBODIMENT

FIGS. 1, 2 and 3 show leak-detector 11 having a plurality of untested plastic bottles or containers 13 resting upon conveyor belt 15, and a plurality of containers or bottles 17 resting upon porous dead plate 19 and about to be tested. The conveyor belts 15 and 21 all move in the direction shown by arrows 23, and carry the containers forward.

Diaphragm switch 31 is connected to needle valve 33. One end of tube 35 is connected to valve 33. Tube 37 is connected to one of the supporting arms of U-frame 39, and the other end of tube 35 is connected to the other arm of U-frame 39. When the air gap of U-frame 39 between tubes 35 and 37 is unobstructed, the air stream therebetween is not interrupted and is able to build up the pressure against the diaphragm in switch 31, thereby causing the leak-detector machine 11 to be turned off. When a bottle is positioned within the U-frame 39, the air stream between tubes 35 and 37 is interrupted, and the switch 31 turns on the leak-detector machine 11 after a short delay while the air leaks out of the diaphragm switch 31, past the needle valve 33.

The needle valve 33 is used to restrict the flow of return air from diaphragm switch 31, and functions as a time delay. Valve 33 can be adjusted so that the time delay will allow the first six bottles to be carried through U-frame 39 upon belt 15, until the leading bottle 41 encounters stop 43, which is a right angular arm extending from push bar 45. When the seventh bottle 47 comes to rest within U-frame 39, thereby interrupting the air stream between tubes 35 and 37, the next cycle will begin. Stop 43 is adjustable, to accommodate different size bottles.

The piston 51 of cylinder 52 then moves in the direction shown by arrow 53, and aided by guides 54, causes push bar 45 to force the six bottles 17 off conveyor belt 15 laterally onto dead plate 19. The stop 55 extends perpendicularly from push bar 45 and prevents the forward movement of bottle 47, which has remained on conveyor belt 15. The containers 13 also remain on belt 15. Piston 51 then reverses its direction and moves push bar 45 back to its starting position, allowing conveyor belt 15 to move the bottles 13 forward into position until the leading bottle 47 encounters the stop 43. It is to be understood that a six-bottle machine and time delay has been shown by way of example only.

With the bottles in place and the seventh bottle blocking the air stream, the machine operates and causes the heads with the six spouts 57 to move down. Each test station head is individually operated by its own piston 58 and cylinder 59, in case the bottles 17 have different heights, and each spout 57 enters one of the six bottles 17.

FIG. 4 shows how a spout 57 enters a bottle 17 until the rubber washer 60 rests tightly against the mouth 61 of bottle 17 and forms an air-tight seal therebetween, provided the bottle 17 is a good bottle. Low-pressure air from a gas regulator with about 10 inches of water operating pressure is then allowed to flow into the bottles 17 through spout 57. This air system and the operation of the manometers will now be described.

FIG. 5 shows manometer 61 having left leg 63 and right leg 65. Right leg 65 is open to the atmosphere at end 69, and contains snubbing orifice 71. Spout 57 is connected to left leg 63 through tubes 73 and 75. Left leg 63 contains upper tube 77 and lower tube 79, which are joined by angular member 81 containing upper electrode 83 and lower electrode 85. Angular member 81 is actually a "K" shaped hollow passageway within bracket 87, which is bolted to support panel 89. The electrodes 83 and 85 are adjustably bolted to bracket 87 and are connected to electrical conductors 91 and 93, respectively. The compartment in which upper electrode 83 is located traps air which electrically isolates the top of upper electrode 83.

The pair of electrodes 83 and 85 are separated by about ¼ of an inch and are positioned within the center of the approximately ⅜₆ of an inch hole in bracket 87. The electrodes 83 and 85 are made of stainless steel, and the electrically-conductive fluid within manometer 61 is preferably made of 1% to 5% phosphoric acid and enough water wetting agent such as a non-sudsing liquid detergent to keep the water from forming into droplets on the sides of the manometer wall, and with enough methyl orange indicator to make the fluid visible and to indicate that the solution is acidic.

It is not essential that the electrically-conductive fluid be acidic; a basic solution could also be used. It is essential, however, that the electrically-conductive fluid has sufficiently low film-strength properties so that it does not form droplets between the pair of electrodes or across the air gap separating upper electrode 83 from the wall of the manometer 61. In addition, the film formed on the wall of the manometer 61 by the electrically-conductive fluid must have an electrical resistance sufficiently high to prevent the undesired triggering of the amplifier circuit connected to the electrodes.

Thus, the electrically conductive fluid must be one that will conduct enough electricity to trigger the amplifier circuit connected to the electrodes, when the level of the fluid rises sufficiently high to reach the upper electrode, but which will not conduct enough electricity to trigger the amplifier when the fluid level is below the upper electrode, and the electricity tries to run up the wet walls of the manometer 61.

Low-pressure air from gas regulator 97 flows through T-connector 99 into the bottle 17 by way of tube 73 and spout 57, and to left leg 63 of manometer 61 by way of tube 75. The low-pressure air at less than 2 atmospheres pressure, or preferably at about 10 inches of water operating pressure, is allowed to flow into the bottle 17 and to the manometer 61 until the level of the electrically-conductive fluid in left leg 63 drops just below the bottom extremity of the top electrode 83. There will be some overtravel because of the time lost in milliseconds in closing the valve. The overtravel determines the sensitivity, because once the air starts leaking from a defective bottle, the loss of air immediately shows up as a rise in the height of the electrically-conductive fluid level in left leg 63. When the electrically-conductive fluid reaches the upper electrode 83, an electrical circuit is closed, and the air leak is recorded.

As a consequence of the fact that the system works at such low pressures, there is almost no compression of the air, and a .1 cubic centimeter (cc.) leak in the bottle being tested will show up as a .1 cc. movement of the electrically-conductive fluid within the manometer, so that the volume of air loss is being measured, not the pressure loss. It has been found that about 8 to 10 inches of water pressure on a bottle will show up a leak, as fast as higher pressure will.

The overtravel, or sensitivity, is adjusted by the amount of overpressure from the gas regulator. The overtravel can also be adjusted by allowing the gas regulator to set the pressure in the bottle and then shutting the valve after the fluid has a chance to settle down.

The orifice 71 in the right leg 65 of the manometer 61 allows the air to escape quickly as the electrically-conductive fluid level rises in right leg 65, but when the electrically-conductive fluid reaches the orifice 71, the further movement of the fluid is snubbed. Ideally, there should be just enough fluid in manometer 61 to fill it between the upper electrode 83 and the orifice 71. The amount of overtravel can be adjusted by the amount of dwell which extra electrically-conductive fluid enforces on the electrode. The orifice could be replaced by a needle valve, which would also provide adjustment on the sensitivity and overtravel.

Initially, the right leg 65 is adjusted so that orifice 71 is moved to the level of the bottom extremity of upper electrode 83. The fluid level should be at the level of orifice 71. Orifice 71 is then raised until it is about 9 inches above the bottom of upper electrode 83, with the low-pressure air being about 10 inches of water pressure.

During the charge cycle, the pressure coming from the gas regulator 97 forces the electrically-conductive fluid below the lower extremity of upper electrode 83, breaking the electric circuit. At this point, the fluid will have risen through the orifice 71, above the level thereof.

In the absence of the described orifice, the electrically-conductive fluid would bounce up and down, resulting in an irregular and false overpressure, because each time the electrically-conductive fluid would open a solenoid valve in the circuit, and allow more air into the bottle being tested for leaks. In addition, in order to speed up the cycle, it is desirable for the fluid to go quickly to almost the position that it will stop at and to be slowed at that position.

FIG. 6 shows in schematic form the wiring diagram used with the manometer 61. Upper electrode 83 is electrically grounded through conductor 91. Lower electrode 85 is connected to semiconductor amplifier 101 by conductor 93. The amplifier 101 is a silicon gate-controlled AC switch used for control circuits.

The amplifier 101 enables the coil 103 of a charging solenoid valve to carry a large current in amperes while only a small current in milliamperes passes through the electrically-conductive fluid in manometer 61. Whereas mercury would be able to carry large currents, the described electrically-conductive fluid cannot, making the use of a semiconductor amplifier or vacuum tube or other electrical amplifier necessary. When the fluid electrically interconnects the electrodes 83 and 85 in the manometer 61, the relay coil 105 closes switch 107 during the read cycle, so that the solenoid coil 103 can be activated during the charge cycle, but when the electrodes 83 are not electrically interconnected, the circuit through relay coil 105 is open, and the switch 107 remains open during the read cycle, thereby opening the circuit through the solenoid coil 103. Thus, the small current passing through the electrically-conductive fluid can be utilized as a control circuit for the solenoid coil.

Similarly, when the bottle being tested leaks, relay coil 105 also closes switch 109 during the read cycle, so that the solenoid coil 111 can be activated during the blow-off cycle. When the bottle being tested does not leak and the relay coil 105 remains open during the read cycle, the switch 109 remains open, and the solenoid coil 111 is not activated during the blow-off cycle.

Switch 113 enables relay 105 to operate as a latching relay. When the relay coil 105 is activated during the read cycle, it closes switch 113, which closes the latching circuit and holds relay coil 105 in its activated condition, thereby holding switches 107 and 109 closed during the charging and blow-off cycles, respectively. These latter two cycles occur only after the spouts have been withdrawn out of the six bottles being tested.

Switches 121, 123, 125, 127, 129, 131 and 133 are all sequentially cam-operated. Solenoid coils 135 and 136, connected to switch 123, and solenoid coils 137 and 138, connected to switch 125, function as 3-way solenoid valves for operation of the machine as by raising and lowering the heads, etc. Relay coils 141 and 143 operate the relay contacts 145, 147, 149, 151, 153 and 155, with each set of contact points being for one of the six stations. The dotted line 161 encloses only one manometer station and its associated electrical circuit, but it is to be understood that each of the other five stations, although not shown in FIG. 6, operaters in the same manner.

After the bottles which leak, if any, are blown off dead plate 19, the operation is repeated, as hereinbefore described, except that this time, when push bar 45 pushes the next six bottles laterally onto dead plate 19, they in turn force all the remaining bottles 17 laterally onto conveyor belt 21, as shown by bottle 17′ in FIG. 3. Conveyor belt 21 then carries away those bottles, all of which have passed the described leak detection test satisfactorily.

FIG. 7 shows a different electromanometer that could be used in place of the described manometer 61. U-tube 171 has a left leg which can be connected to spout 57 by tube 75, and a right leg which can be connected to snubbing orifice 71. Insulated electrical conductors 173 and 175 are inserted into U-tube 171 through its right leg. The insulation is removed from ends 177 and 179 of conductors 173 and 175, respectively, thereby exposing the bare metal of each conductor.

When the level of the electrically-conductive fluid 181 is as shown in FIG. 7, the bare conductor ends 177 and 179 are interconnected by fluid 181, and the circuit is closed. When the bottle being tested is under pressure, the level of the fluid 181 within the left leg of manometer 171 drops down below end 177, thereby opening the circuit. If the bottle being tested contains a leak, the level of fluid 181 will rise until it reaches end 177, and the circuit will be closed.

While particular embodiments of the present invention have been shown and described, it will be obvious to those skilled in the art that changes and modifications may be made without departing from this invention in its broader aspects.

I claim:

1. Apparatus for detecting leaks in plastic containers, comprising:
    (a) means for forming a chamber, with the container to be tested serving as at least a portion of the wall of said chamber, said means for forming a chamber including at least one test station including an opening for the passage of said gas,
    (b) means for coupling said opening to the container to be tested,
    (c) means for injecting pressurized gas at less than two atmospheres pressure into said container,
    (d) means including a manometer for determining whether said gas is escaping from said container at a rate greater than a predetermined maximum, by measuring the reduction in volume that occurs in said gas when a leak is present in said container, said manometer including an electrically-conductive fluid including water, and a pair of electrodes, said fluid providing an electrically-conductive path between said electrodes when said fluid is beyond a predetermined level, said electrodes being electrically disconnected when said fluid is not beyond said predetermined level, and said fluid including a wetting agent and having sufficiently low film-strength properties so that it does not form droplets between said electrodes and the wall of said manometer, and
    (e) snubbing means positioned in a leg of said manometer.

2. Apparatus as defined in claim 1 including, in addition, an electrical circuit including an amplifier coupled to one of said electrodes, and in which the film formed on the wall of said manometer by said electrically-conductive fluid has an electrical resistance sufficiently high to prevent the triggering of said amplifier when said electrically-conductive fluid is not beyond said predetermined level.

3. Apparatus as defined in claim 2 in which the upper one of said electrodes is located within a compartment which is positioned and has a configuration such that it traps sufficient air to electrically isolate the top of said upper electrode within said compartment.

4. Apparatus as defined in claim 2 including, in addition:
    (d) a plurality of said test stations,
    (e) conveyor means for transporting the containers to be tested toward and away from said test stations,
    (f) resilient sealing means for sealing each of said test stations to one of said containers,
    (g) means for uncoupling said test stations from said containers, and
    (h) rejection means for rejecting the containers that have leaks greater than said predetermined maximum.

5. Apparatus as defined in claim 4 including, in addition, container sensing means having a diaphragm switch in which air pressure impinging on the open end of tubular means connected to the higher-pressure side of said diaphragm causes said switch to change from a first condition to a second condition, and also having an orifice release which allows the air to escape slowly from said higher-pressure side when said impinging air pressure is interrupted, thereby allowing said switch to return to its first condition after a time delay following the interruption of said impinging air pressure, said switch causing said apparatus to be turned on when said switch is in said first condition, and causing said apparatus to be turned off when said switch is in said second condition.

6. An electro-manometer comprising:
    (a) a pair of legs, one leg being designed to be open to the atmosphere and the other leg closed to the atmosphere,
    (b) an electrically-conductive fluid, and
    (c) a pair of electrodes associated with said closed leg, one electrode being positioned higher than the other electrode, the upper one of said electrodes having a lower end which is positioned within said closed leg and an upper end which is positioned within a separate compartment which is connected to, but leads away from, said closed leg, said compartment having a configuration which traps sufficient to electrically isolate the top of said upper electrode within said compartment, said fluid providing an electrically-conductive path between said electrodes when said fluid is beyond a predetermined level, said electrodes being electrically disconnected when said fluid is not beyond said predetermined level, said fluid including a wetting agent and having sufficiently low film-strength properties so that it does not form droplets between said electrodes and the wall of said manometer, and the film that is formed on the wall of said manometer by said fluid having an electrical resistance sufficiently high to prevent the triggering of amplifier means coupled to said electrodes when said fluid is not beyond said predetermined level.

7. An electro-manometer comprising:
    (a) an electrically-conductive fluid, and
    (b) a pair of electrodes positioned in spaced relationship within said electro-manometer such that when said electrically-conductive fluid is beyond a predetermined level, said fluid provides an electrically conductive path between said electrodes, and when said fluid is not beyond said level, said electrodes are not electrically interconnected, said fluid including a wetting agent so that it does not form droplets between said electrodes and the wall of said electro-manometer, and the film that is formed on the wall of said electro-manometer by said fluid having an electrical resistance sufficiently high to prevent the triggering of amplifier means coupled to said electrodes when said fluid is not beyond said predetermined level, said upper electrode being an insulated wire conductor having a bare end which makes electrical contact with said fluid, a portion of the insulated part of said conductor remaining submerged in said fluid when said bare end is not in electrical contact with said fluid.

8. Apparatus for detecting leaks in plastic containers, comprising:
  (a) means for forming a chamber, with the container to be tested serving as at least a portion of the wall of said chamber,
  (b) means for injecting pressurized gas at less than two atmospheres pressure into said container,
  (c) means including a manometer for determining whether said gas is escaping from said container at a rate greater than a predetermined maximum, by measuring the reduction in volume that occurs in said gas when a leak is present in said container, and
  (d) snubbing means positioned in a leg of said manometer which is open to the atmosphere.

References Cited
UNITED STATES PATENTS

| | | | |
|---|---|---|---|
| 1,815,522 | 7/1931 | O'Neil et al. | 73—45.2 |
| 1,815,837 | 7/1931 | Deisch | 73—45.2 |
| 1,865,384 | 6/1932 | O'Neil | 73—45.2 |
| 2,433,043 | 12/1947 | Gray | 73—45.2 |
| 3,106,835 | 10/1963 | Henderson | 73—40 XR |
| 3,176,503 | 4/1965 | Robinson | 73—40 |

LOUIS R. PRINCE, Primary Examiner

H. C. POST III, Assistant Examiner

U.S. Cl. X.R.

73—401

UNITED STATES PATENT OFFICE
CERTIFICATE OF CORRECTION

Patent No. 3,527,084           Dated September 8, 1970

Inventor(s) Herman Laub III

It is certified that error appears in the above-identified patent and that said Letters Patent are hereby corrected as shown below:

Column 4, line 52, after "electrodes 83", insert --- and 85 ---.

Column 6, line 50, after "ent", insert --- air ---.

SIGNED AND SEALED
FEB 9 1971

FEB. 9, 1971

(SEAL)
Attest:

Edward M. Fletcher, Jr.
Attesting Officer

WILLIAM E. SCHUYLER, JR.
Commissioner of Patents